D. E. CRIPE.
Improvement in Fertilizers.

No. 126,187.　　　　　　　　　　　　Patented April 30, 1872.

Witnesses.
Geo. H. Howard.
H. A. Daniels

Daniel E. Cripe  Inventor
C S Whitman  Attorney 126,187

UNITED STATES PATENT OFFICE.

DANIEL E. CRIPE, OF PYRMONT, INDIANA.

IMPROVEMENT IN MANURE-DISTRIBUTERS.

Specification forming part of Letters Patent No. 126,187, dated April 30, 1872.

SPECIFICATION.

*To all whom it may concern:*

Be it known that I, DANIEL E. CRIPE, of Pyrmont, in the county of Carroll and in the State of Indiana, have invented an Improved Manure-Wagon; and do hereby declare that the following description, taken in connection with the accompanying plate of drawing, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of vehicles which are made use of for conveying and distributing manure; and the nature thereof consists in certain modifications in the details of the construction thereof, hereinafter described and shown.

Figure 1:
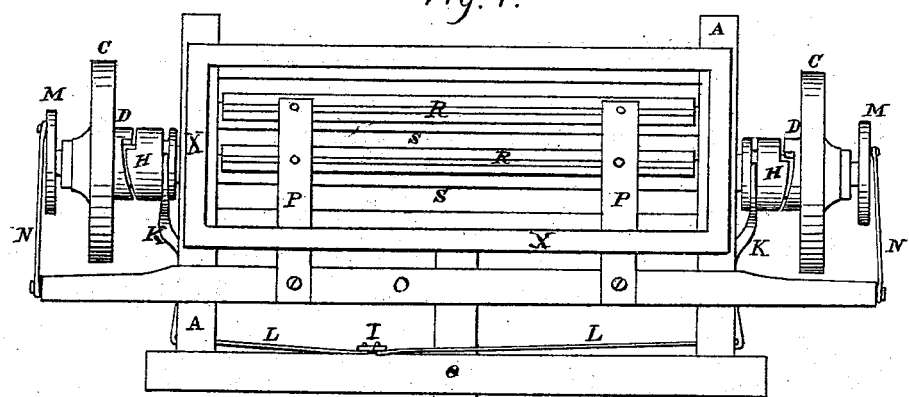
Figure 2:
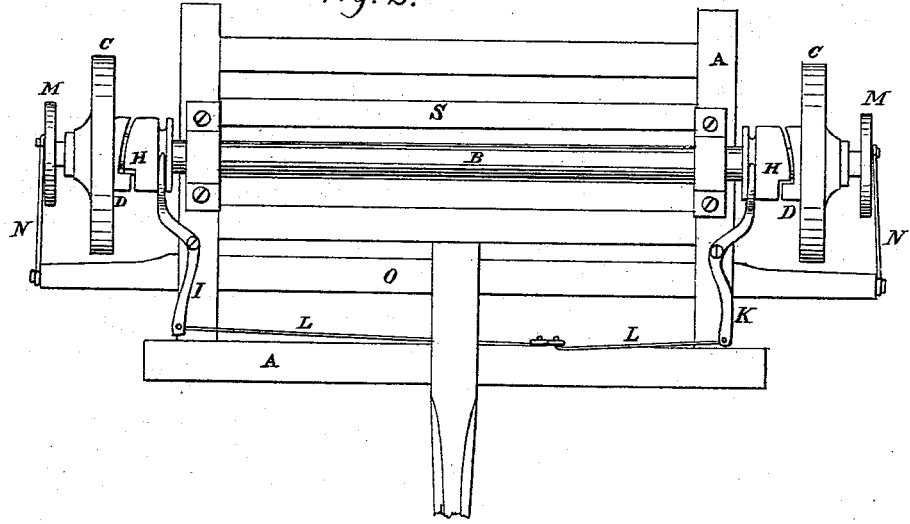

In the accompanying plate of drawing, which illustrates my invention and forms a part of the specification thereof, in which corresponding parts are illustrated by similar letters, Figure 1 is a plan view. Fig. 2 is a bottom view.

In the said drawing, A designates the frame of the vehicle supported upon the axle B, upon which revolve the wheels C. Secured to the hubs of the said wheels are the half-clutches D, by means of which and the half-clutches H sliding upon a key or feather fixed on the horizontal axle, the axles and wheels are made to rotate either independently or together, as may be desired. The box X, containing the manure to be distributed, rests upon the frame A, and is provided with quadrangular apertures, through which pass the cross-pieces P. The half-clutches H are operated by means of the levers I and K and connecting-rods L. Upon the outer ends of the said axle are the flanges M, connected, by means of the connecting-rods N, with the reciprocating-bar O, which is operated by them. The said reciprocating-bar is connected, by means of the cross-pieces P, with the bars or knives R, which travel backward and forward across the bars S of the frame, between which are openings for the escape of the manure.

It is obvious that, by this arrangement of mechanism, the manure is cut and uniformly distributed over the surface of the ground when the vehicle is put in motion.

Having thus described the construction and operation of my invention, I will indicate in the following clause what I claim and desire to secure by Letters Patent of the United States—that is to say,

I claim—

In a vehicle for conveying and distributing manure, the crank-wheel M, the connecting-rod N, the reciprocating frame, consisting of the bars O, P, and R, in combination with the box X when provided with bars S, all operating together, as and for the purposes described.

In testimony that I claim the foregoing I have hereunto set my hand this 18th day of September, 1871.

D. E. CRIPE.

Witnesses:
JOSEPH ZAHN,
SAMUEL HEISLER.